United States Patent
Ichikawa et al.

(10) Patent No.: US 7,421,577 B2
(45) Date of Patent: Sep. 2, 2008

(54) COMMUNICATION DEVICE, CONTROL METHOD OF COMMUNICATION DEVICE, PROGRAM AND COMMUNICATION METHOD

(75) Inventors: Yuichi Ichikawa, Yokosuka (JP); Naoki Naruse, Yokohama (JP); Tatsuro Oi, Kawasaki (JP); Nobuyuki Watanabe, Sayama (JP); Yasunori Hattori, Fujisawa (JP); Masato Takeshita, Mitaka (JP); Masakazu Nishida, Yokosuka (JP); Mao Asai, Yokosuka (JP); Masayuki Tsuda, Shinagawa (JP); Atsuki Tomioka, Yokohama (JP); Kazuhiro Yamada, Yokohama (JP); Dai Kamiya, Tokyo (JP); Satoshi Washio, Tokyo (JP); Naoki Yamane, Tokyo (JP); Keiichi Murakami, Ichikawa (JP)

(73) Assignee: NTT DoCoMo, Inc., Tokyo (JP)

( * ) Notice: Subject to any disclaimer, the term of this patent is extended or adjusted under 35 U.S.C. 154(b) by 653 days.

(21) Appl. No.: 10/815,106

(22) Filed: Mar. 31, 2004

(65) Prior Publication Data

US 2004/0260939 A1 Dec. 23, 2004

(30) Foreign Application Priority Data

Mar. 31, 2003 (JP) ............................. 2003-096015

(51) Int. Cl.
| | |
|---|---|
| H04L 9/00 | (2006.01) |
| G06F 7/04 | (2006.01) |
| G06F 7/58 | (2006.01) |
| G06F 15/16 | (2006.01) |
| G06F 17/30 | (2006.01) |
| G06K 9/00 | (2006.01) |
| G06F 1/00 | (2006.01) |
| G06F 13/30 | (2006.01) |
| G06F 9/44 | (2006.01) |

(52) U.S. Cl. ........................ 713/156; 713/158; 713/168; 713/169; 713/170; 713/175; 726/10

(58) Field of Classification Search ................. 713/158, 713/168, 169, 170, 156, 175; 726/10
See application file for complete search history.

(56) References Cited

U.S. PATENT DOCUMENTS 6,526,513 B1 * 2/2003 Shrader et al. .................. 726/4

(Continued)

FOREIGN PATENT DOCUMENTS

EP 0 813 132 A2 12/1997

(Continued)

OTHER PUBLICATIONS

EPO Office Action dated May 26, 2006.

(Continued)

*Primary Examiner*—Ayaz Sheikh
*Assistant Examiner*—Shin-Hon Chen
(74) *Attorney, Agent, or Firm*—Brinks Hofer Gilson & Lione

(57) ABSTRACT

The present invention provides a means for reflecting modifications made in a server to data with regard to a scope of rights, which are granted to an application program operable in a communication device such as a mobile station, on data stored in the communication device. To achieve the aim, in a system according to the present invention, Java-AP software is provided to a mobile station by transmitting an ADF, a SDF and a JAR file from servers to the mobile station in that order. The SDF is a file containing data indicating restrictions of behavior of a Java-AP in a mobile station. The SDF also contains data indicating a validity state of the SDF, namely 'valid' or 'invalid', which is managed by management server device 18. Before a mobile station runs a Java-APP which is installed in the mobile station, the mobile station accesses management server device 18 and checks whether a SDF corresponding to the Java-APP is valid. When the SDF is valid, the mobile station runs the Java-APP following the restrictions indicated in the SDF.

21 Claims, 8 Drawing Sheets

U.S. PATENT DOCUMENTS

| | | | |
|---|---|---|---|
| 6,766,353 B1 * | 7/2004 | Lin et al. | 709/203 |
| 6,910,128 B1 * | 6/2005 | Skibbie et al. | 713/170 |
| 6,993,665 B2 * | 1/2006 | Heddings et al. | 726/21 |
| 2003/0079125 A1 * | 4/2003 | Hope et al. | 713/156 |
| 2003/0212888 A1 * | 11/2003 | Wildish et al. | 713/158 |

FOREIGN PATENT DOCUMENTS

| | | |
|---|---|---|
| EP | 1 132 796 A1 | 9/2001 |
| JP | H08-076994 | 3/1996 |
| JP | H10-254783 | 9/1998 |
| JP | 2001-265584 | 9/2001 |
| JP | 2002-539515 | 11/2002 |
| JP | 2003-029862 | 1/2003 |
| JP | 2003-500722 | 1/2003 |
| WO | WO00/72119 | 9/2000 |
| WO | WO00/54128 | 11/2000 |
| WO | WO 01/84283 A2 | 11/2001 |
| WO | WO 03/021467 A1 | 3/2003 |

OTHER PUBLICATIONS

Japanese Office Action dated Feb. 6, 2007.

Noar, M. et al., "Certificate Revocation and Certificate Update", *IEEE Journal on Selected Areas in Communications, IEEE Service Center*, vol. 18 No. 4, Apr. 2000, pp. 561-570.

European Patent Office Action for application No. 04 007 646.5—1245 dated Sep. 11, 2007.

Japanese Patent Office Action for application No. 2003-096015 dated Mar. 18, 2008 (including translation).

* cited by examiner

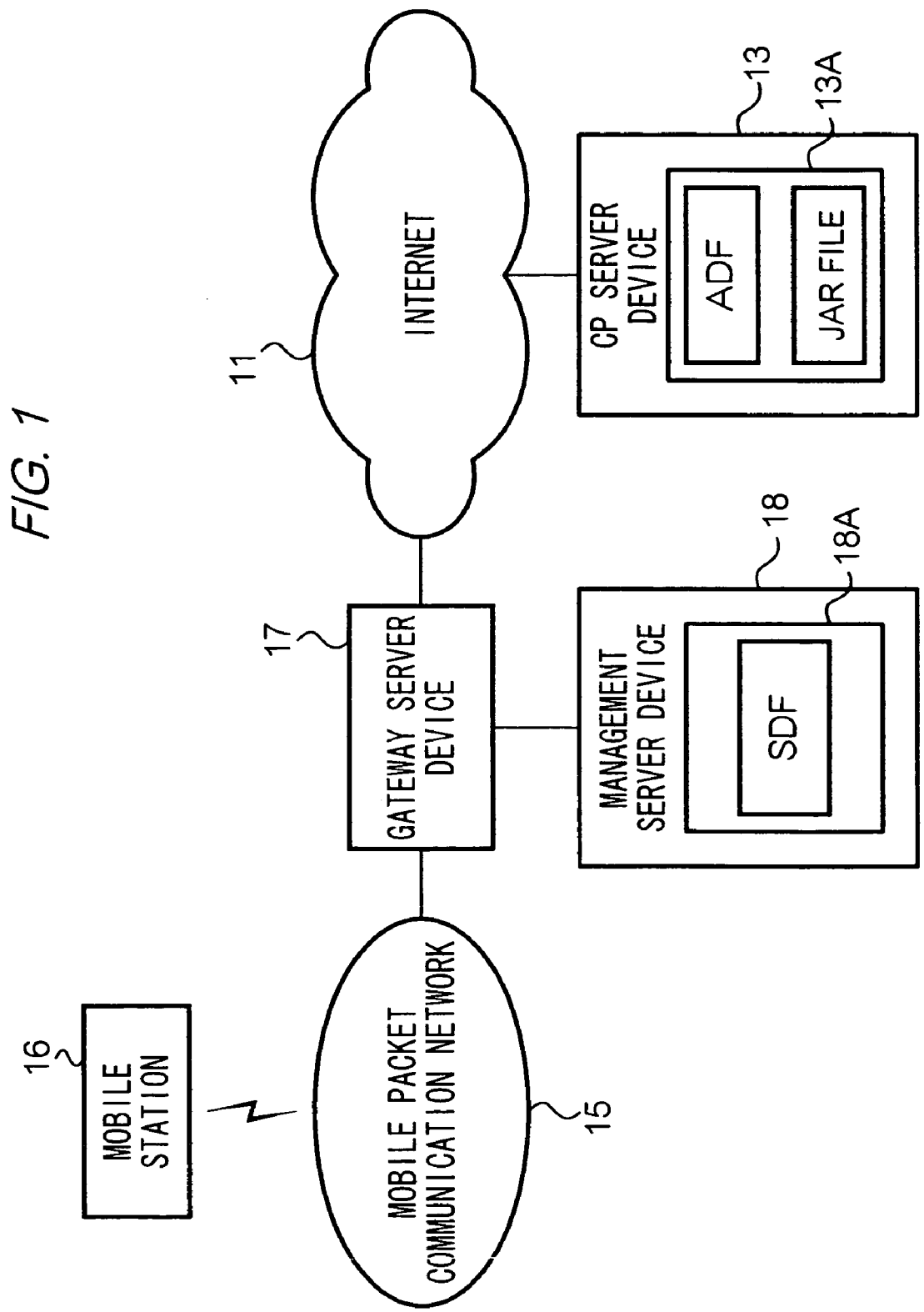

FIG. 2

```
HTTP/1.0 200 OK
Content-Type:application/x-sdf
    .
    .

<CR><LF>
Sts = 00 <CR><LF>
PackageURL = http://cpserver.com:8080/Demo.JAR <CR><LF>
CheckCnt = 005 <CR><LF>
CheckInt = 020 <CR><LF>
SuspendedCnt = 005 <CR><LF>
Lmd=20020614120552 <CR><LF>
GetPrivateInfo = yes <CR><LF>
UseMailer = yes <CR><LF>
MessageApp = yes <CR><LF>
SetPhoneTheme = yes<CR><LF>
SetLaunchTime = yes <CR><LF>
AllowedHost = http://aaa.co.jp http://bbb.co.jp:8080 <CR><LF>
```

FIG. 5

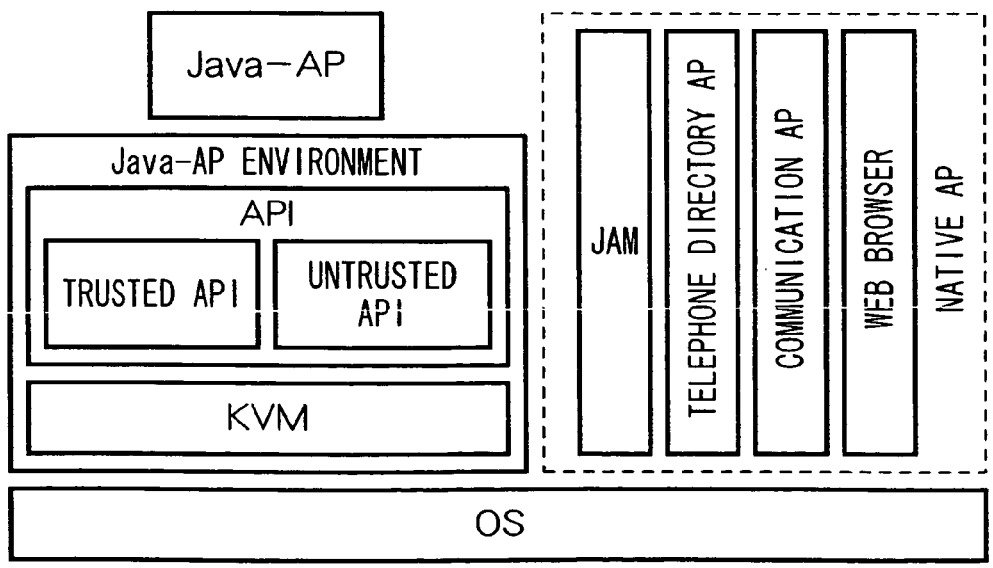

FIG. 4

| AP ID | 1000001 | | |
|---|---|---|---|
| ADF-URL | http://CPserver.com:8080/Demo.adf | | |
| SDF-URL | http://MNserver.com:8080/Demo.sdf | | |
| PACKAGE URL | http://CPserver.com:8080/Demo.JAR | | |
| VALIDITY STATUS OF SDF | 00(VALID) | | |
| COUNT FOR SDF CHECK | 5 (TIMES) | NUMBER OF EXECUTION TIMES | 2 (TIMES) |
| INTERVAL FOR SDF CHECK | 20 (DAYS) | NUMBER OF PASSED DAYS | 15 (DAYS) |
| EXPANDED COUNT FOR SDF CHECK | 5 (TIMES) | USED EXPANDED COUNT FOR SDF CHECK | 1 (TIME) |
| LAST UPDATE TIME | 5 MINUTES AND 52 SECONDS PAST 12 O'CLOCK ON JUNE 14TH IN YEAR 2002 | | |
| PERMISSION DATA | GetPrivateInfo | YES | |
| | Usermailer | YES | |
| | MessageApp | YES | |
| | SetPhoneTheme | YES | |
| | SetLaunchTime | YES | |
| | AllowedHost | aaa.co.jp:8080 | |
| | AllowedHost | bbb.co.jp:8080 | |

FIG. 8

```
HTTP/1.0 200 OK
Content-Type:application/x-sdf
       •
       •
<CR><LF>
Sts = 00 <CR><LF>
```

FIG. 9

```
HTTP/1.0 200 OK
Content-Type:application/x-sdf
       •
       •
<CR><LF>
Sts = 10 <CR><LF>
```

COMMUNICATION DEVICE, CONTROL METHOD OF COMMUNICATION DEVICE, PROGRAM AND COMMUNICATION METHOD

This application claims priority under 35 U.S.C. §119 to Japanese Patent Application No. 2003-096015 filed Mar. 31, 2003, the entire content of which is hereby incorporated by reference.

TECHNICAL FIELD

The present invention relates to a technology for granting application behavior rights.

BACKGROUND ART

Recently, many new functions for use in mobile stations have been developed. These include, for example, functions for downloading software containing application programs written in Java (registered trademark) programming language (the application program will be referred to as 'Java-APP', and the software will be referred to as 'Java-AP software' hereinafter), through communication networks, and also functions for running Java-APPs.

Behavior of applications, which are groups of functions realized in mobile stations when Java-APPs are run (the application will be referred to as 'Java-AP' hereinafter) is generally subject to greater restriction than that of native application programs, which application programs are installed in mobile stations prior to distribution to users; and include email communication applications, and the like. (For example, refer to Japanese patent laid-open No. 10-254783.)

Specifically, Java-APs are generally not permitted to access confidential data, such as telephone directory data stored in a mobile station. The rationale for restricting the behavior of Java-APs in this way is to prevent leakage or falsification of confidential data by Java-APs which are realized by Java-APPs containing either malicious code or code errors.

However, imposing strict behavior restriction on all Java-APs makes it impossible to meet demands of users who wish to use a variety of new and useful functions of Java-APs. Similarly, such comprehensive restriction also makes it impossible for Contents Providers (referred to as 'CPs' hereinafter) to provide to users Java-APPs which are capable of providing a variety of such functions.

In a case that reasonable security (reliability) of such Java-APPs can be assured, it is likely that users would not object to Java-APs being able to access personal data stored in a mobile station in which they are run. Moreover, it would be desirable for CPs to be able to provide users with more functional Java-APPs than is currently the case, and which can provide various functions in utilizing personal data stored in mobile stations.

To meet the demands explained above, different systems have been proposed, such as the one outlined below.

In this example, a carrier which provides communication services to users of mobile stations grants rights of behavior with fewer restrictions to Java-APs, than those that are normally applied; and the carrier informs the mobile stations of the kind of rights that have been granted to the Java-APs. The carrier would normally be one that is considered to be reliable in terms of security by users; thus, in this explanation the expression 'reliable agency' is used. In the system in question, restriction of behavior of Java-APs is controlled at a mobile station on the basis of rights informed to the mobile station by the reliable agency.

However, this system suffers from a problem. Namely, during use, the reliable agency informs mobile stations of those rights of behavior for which restrictions are relaxed for Java-APPs operable in the mobile stations. Then, the mobile stations accordingly set restrictions for the behavior of the Java-APs. However, it may become necessary for the reliable agency to modify information about such behavior rights. This would be the case, say, in a situation where it is retrospectively realized that a behavior right relaxation of a Java-AP is having a detrimental effect on users. Such a case could include that in which a Java-AP reads out personal data stored in a mobile station memory and transmits the data to an external device without the consent of the owner. In this case, it would be necessary for the reliable agency to immediately modify allowable behavior of the Java-AP. Simply put, there will be occasions on which to ensure data security it becomes necessary to (rapidly) modify rights of behavior granted by a reliable agency to a Java-AP.

In consideration of such problems, the present invention has been made to provide a system which enables modifications of rights, which have been granted to communication devices such as mobile stations, to be reflected as restrictions of behaviors in the communication devices.

DISCLOSURE OF THE INVENTION

To solve the problem of the conventional art described above, the object of the present invention is to provide a communication device comprising: an executing means for executing software; a permission data storing means for storing permission data indicating permissible behavior for an application, which is a group of functions provided by execution of the software; a checking means for checking, by accessing an external device before the software is executed, whether the permission data are valid; and an execution control means for permitting the executing means to execute the software when, on the basis of a result of the check carried out by the checking means, the permission data are determined to be valid, and for not permitting the executing means to execute the software when, on the basis of the result of the check executed by the checking means, the permission data are determined to be invalid.

According to the communication device of the present invention, since a validity of permission data is checked by accessing an external device before software is executed, secure execution of software can be realized.

In a preferred embodiment, the present communication device further comprises a determining means for determining whether it is necessary to carry out the check by the checking means, the determining means either carrying out or not carrying out the check on the basis of a determination made by the determination means.

As will be apparent from the foregoing description, in the communication device of the present invention, it is possible to determine whether a check is actually required. As a result, communication operations can be simplified in comparison with a system in which a check must be conducted each time software is to be executed.

In another preferred embodiment, in the present communication device, the determining means comprises: a counting means for counting a number of executions of the software; and a frequency data storing means for storing frequency data indicating how frequently it is necessary to carry out the check; and wherein, the determining means determines, on the basis of a number of executions of the software, as counted by the counting means, and on the basis of the frequency data stored in the frequency data storing means, whether it is necessary to carry out a check by the checking means.

According to the present communication device, the check is carried out on the basis of a number of execution times of the software.

In another preferred embodiment, in the communication device, the determining means comprises: a timer means for providing time data indicating a present time; and a time interval data storing means for storing time interval data indicating a time interval at which it is necessary to carry out the check; and wherein, the determining means calculates, on the basis of time data provided by the timer, a time period between a present time and a time recorded at a most recent execution of the software, and determines whether it is necessary to carry out the check by the checking means on the basis of the calculated time period and the time interval data stored in the time interval data storing means.

Thus, according to the present communication device, the check is carried out on the basis of a determined time interval.

In another preferred embodiment, the communication device further comprises count data storing means for storing count data indicating a count of times that the software is allowed to be executed in a condition that the checking means is unable to make the check; and the execution control means permits the executing means to execute the software in a condition that the checking means is unable to make the check up to a number of times which is indicated by the count data stored in the count data storing means.

According to the present communication device, especially when the communication device is a mobile station which communicates with an external device wirelessly, a user can start the software up to a certain number of times even when the communication device is unable to make the check in a situation, for example, where a communication failure of some sort occurs, which is not uncommon in wireless systems.

In another preferred embodiment, the communication device further comprises an updating means for obtaining update data from the external device, and updating the permission data stored in the permission data storing means on the basis of the update data.

In another preferred embodiment, in the present communication device, the updating means transmits, to the external device, update timing data indicating a timing of a most recent update of the permission data stored in the permission data storing means, when the checking means makes the check; receives update data transmitted from the external device in response to the transmission of the update timing data; and updates the permission data stored in the permission data storing means on the basis of the update data.

In another preferred embodiment, the communication device further comprises a terminating means for instructing the executing means to terminate execution of the software when the application attempts to conduct behavior which the application is not permitted to conduct.

In another preferred embodiment, in the communication device, the permission data contain information on usage of at least one of an internal hardware resource of the communication device, an external hardware resource of the communication device, a software resource and a communication network resource.

The present invention also aims to provide a method for controlling a communication device comprising: a step for transmitting to the communication device permission data, which indicates permissible behavior for an application, which is a group of functions provided by execution of software in the communication device; a step for checking, by communicating data between the communication device and an external device, whether the permission data are valid, before the software is executed in the communication device; and a step for permitting the software to be executed only when the permission data are determined to be valid on the basis of a result of the check.

The present invention also aims to provide a program for instructing a computer to execute: a process for storing, in a storing means, permission data indicating permissible behavior for an application, which is a group of functions provided by execution of software; a process for checking, by accessing an external device, whether the permission data are valid, before the software is executed; and a process for permitting the software to be executed only when the permission data are determined to be valid on the basis of a result of the check.

The present invention further aims to provide a communication method comprising: a step for transmitting from a communication system comprising (a) a software data providing server device which stores software data containing software for providing a group of functions forming an application, (b) a management server device which stores security descriptor data containing permission data indicating permissible behavior for the application, and (c) an application descriptor data providing server device which stores application descriptor data indicating a storage location of the software data and a storage location of the security descriptor data, to the communication device the application descriptor data; a step for transmitting the application descriptor data from the communication system to the communication device; a step for transmitting data indicating the storage location of the security descriptor data contained in the application descriptor data from the communication device to the communication system; a step for transmitting the security descriptor data from the communication system to the communication device on the basis of the data indicating the storage location of the security descriptor data; a step for storing the security descriptor data in the communication device; a step for transmitting data indicating the storage location of the software data contained in the security descriptor data from the communication device to the communication system; a step for transmitting the software data from the communication system to the communication device on the basis of the data indicating the storage location of the software data; a step for installing, in the communication device, the software contained in the software data transmitted from the communication system to the communication device; a step for checking, by communicating data between the communication device and the communication system before the software is executed in the communication device, whether the security descriptor data stored in the communication device are valid; and a step for permitting the software to be executed in the communication device only when the security descriptor data are determined to be valid on the basis of a result of the check.

As mentioned above, according to the present invention, software which should not be executed is prevented from executing in a communication device such as a mobile station, since it is checked whether permission data, indicating behavior, which an application realized by the software is permitted to conduct, is valid or not by accessing an external device; and according to a result of the check, undesirable software is not permitted to be started.

BRIEF DESCRIPTION OF THE DRAWINGS

FIG. 1 is a block diagram showing configurations of a communication system according to an embodiment of the present invention.

FIG. 2 is a figure showing an example of contents of SDF used in the communication system.

FIG. 4 is a figure showing an example of contents stored in a nonvolatile memory of the mobile station.

FIG. 5 is a conceptual diagram showing functional structures of the mobile station.

FIG. 8 is a figure showing an example of SDF check response used in the communication system.

FIG. 9 is a figure showing an example of SDF check response used in the communication system.

PREFERRED EMBODIMENTS FOR CARRYING OUT THE INVENTION

Figure 3:
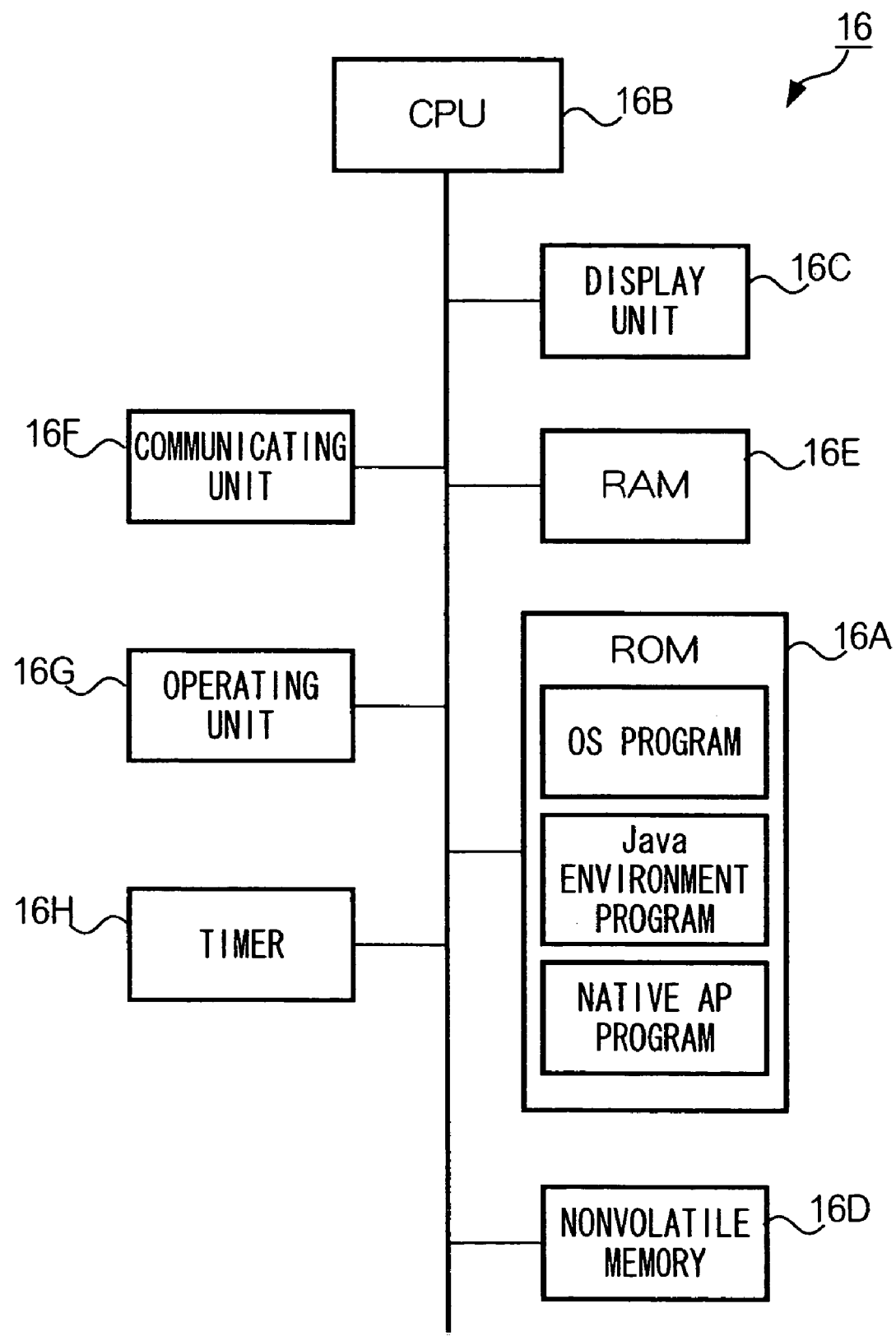
FIG. 3 is a block diagram showing configurations of a mobile station, which is a component of the communication system.

In the following, an embodiment of the present invention will be explained with reference to the drawings. In the drawings, common components are referred to by the same reference numerals.

First, procedures which are followed by a mobile station for downloading Java-AP software in a known communication system will be explained. The mobile station first receives an Application Descriptor File or an Application Description File (referred to as 'ADF' hereinafter) from a server device contained in World Wide Web (referred to as 'WWW' hereinafter). Then, the mobile station receives a Java Archive file (referred to as 'JAR file' hereinafter).

An ADF contains data depending on a corresponding JAR file. For example, the ADF contains data showing a URL indicating a location where the JAR file is stored (referred to as 'package URL' hereinafter), data showing a size of the JAR file, data showing last update time of the JAR file, and so on. These data are indispensable to the ADF. After the mobile station receives the ADF, the mobile station determines whether a Java-APP to be downloaded, which is contained in the JAR file, is installable in the mobile station by referring to data contained in the ADF, checking available memory capacity, and so on. When the mobile station determines that the Java-APP is installable, the mobile station receives the JAR file from a server device in WWW using a package URL contained in the ADF. The mobile station completes the download processes when it receives the JAR file which contains the Java-APP. After the completion of the download, the downloaded Java-APP is installed in the mobile station and it becomes possible to be run. Usually, ADFs and JAR files are prepared by CPs who provide Java-AP. 'Java-AP software' is a term for describing a combination of an ADF and a JAR file in the known communication system.

On the other hand, when a Java-APP is downloaded into a mobile station in the present embodiment, first an ADF corresponding to Java-APP which a user of the mobile station wishes to download is delivered to the mobile station, then a Security Descriptor File or a Security Description File (referred to as 'SDF' hereinafter) which corresponds to the Java-APP is delivered to the mobile station, and finally a JAR file, which contains the Java-APP, is delivered to the mobile station. In short, three different files of ADF, SDF and JAR file are delivered to the mobile station in this order. ADF and JAR file are prepared by a CP who provides the Java-APP in the same way as in the known communication system. However, SDF is prepared by the above-mentioned carrier, following a contract made between the carrier and the CP. In the present embodiment, 'Java-AP software' is also used for describing a combination of an ADF, a SDF and a JAR file.

A SDF is a file describing a scope of rights which are granted to a corresponding Java-APP stored in a mobile station, and a mobile station runs Java-APP following a scope of rights described in a SDF. A server in the communication network stores data indicating whether each SDF is in a valid state or in an invalid state. Before a mobile station runs a Java-APP which is installed in the mobile station, the mobile station accesses the above-mentioned server to verify whether the SDF corresponding to the Java-APP is valid or invalid. In the following explanations this verification process will be called 'SDF check'. If a result of the SDF check is 'in a valid state', the mobile station runs Java-APP following the scope of rights described in the SDF. On the other hand, if the result of the SDF check is 'in an invalid state', the mobile station is not allowed to run the Java-APP.

As explained above, since a state of validity with regard to each SDF can be changed in the server in the communication network, the carrier can easily prevent harmful Java-APP from being run in mobile stations only by setting the SDF corresponding to the Java-APP as in an invalid state.

'Harmful Java-APP' means, for example, a Java-APP which may instruct a mobile station to execute an operation which is not expected by a user of the mobile station, such as reading secret data stored in a memory of the mobile station without consent of the user and transmitting the data to an external device. When the carrier finds any harmful Java-APP, the carrier has to only set the state of the SDF of the harmful Java-APP as in an invalid state. When a contract made between a CP and the carrier becomes invalid, for example, because a period of the contract has expired or the CP has not paid the charge indicated in the contract within the deadline, the carrier can also make the Java-APP so as to not be run just by setting a state of the SDF of the Java-APP as in an invalid state. Moreover, in a case that Java-APP is provided for a trial use only during a specified period, the carrier can make the Java-APP to not be run in the same way as explained above when the period for the trial use has passed.

Conversely, a state of a SDF which is set as in an invalid state may be changed to in a valid state when the carrier wants to allow a Java-APP corresponding to the SDF to be run.

In the following explanation, to describe a situation where a CPU runs a Java-APP to provide a group of functions, namely a Java-AP, the expression 'a Java-AP is realized' will be used.

(1) Configuration

In the following, configurations of the communication system according to the present embodiment will be explained.

As shown in FIG. 1, the communication system comprises CP server device 13 connected to Internet 11, mobile packet communication network 15 which is used by the carrier to provide mobile packet communication services to mobile stations, mobile station 16 which can exchange data packets wirelessly with mobile packet communication network 15 for communicating with an external device through mobile packet communication network 15, gateway server device 17 which interconnects Internet 11 and mobile packet communication network 15, and management server device 18 which is connected to gateway server device 17 via dedicated lines. Practically, the communication system may comprise plural mobile stations and plural CP server devices, but only one of mobile stations 16 and one of CP server devices 13 are shown in FIG. 1 to simplify the figure.

In the following, details of each component of the communication system will be explained.

(1-1) CP Server Device

CP server device 13 has hardware components and features of a general WWW server device. Nonvolatile memory 13A of CP server device 13 stores several JAR files, each of which contains a group of programs written in Java programming language, namely a Java-APP, and several ADFs, each of which contains data with regard to a corresponding JAR file.

In the communication system according to the present embodiment, some Java-APPs are allowed whose corresponding SDFs do not exist. Behavior of a Java-AP which is realized by a Java-APP whose SDF exists is restricted on the basis of its corresponding SDF. Such a Java-APP is called, in this specification, 'trusted Java-APP' since its reliability is guaranteed by the carrier according to a contract made between the carrier and a CP who provides the Java-APP. Similarly, in this specification a Java-AP which is realized by a trusted Java-APP is called a 'trusted Java-AP'. A Java-APP whose ADF does not exist is a usual Java-APP used in a known communication system, and is called, in this specification, 'untrusted Java-APP' since its reliability is not guaranteed. In the same way, a Java-AP which is realized by an untrusted Java-APP is called, in this specification, an 'untrusted Java-AP'. CP server device 13 can store both ADFs for trusted Java-APPs and ADFs for untrusted Java-APPs.

An ADF for a trusted Java-APP contains the same data which are contained in an ADF for an untrusted Java-APP such as a package URL indicating a storage location of a JAR file in WWW, data indicating size of the JAR file, data indicating last update time of the JAR file, and so on. An ADF for a trusted Java-APP further contains data called 'APID' for uniquely identifying the JAR file of the trusted Java-APP, and URL called 'SDF-URL' for indicating a storage location of a corresponding SDF in WWW. Mobile station 16 obtains an ADF corresponding to a trusted Java-APP from CP server device 13, and obtains a corresponding SDF using SDF-URL contained in the ADF.

In the following explanation of the present embodiment, as mentioned above, 'Java-AP software' may mean a combination of an ADF, a SDF and a JAR file when the Java-APP contained in the JAR file is a trusted Java-APP, or a combination of an ADF and a JAR file when the Java-APP is an untrusted Java-APP.

(1-2) Gateway Server Device

Gateway server device 17 is managed by the above-mentioned carrier, and has hardware components and features of a general gateway server device which interconnects a mobile packet communication network and Internet. Gateway server device 17 relays data mutually communicated between mobile packet communication network 15 and Internet 11.

(1-3) Management Server Device

Management server device 18 is managed by the above-mentioned carrier, and has hardware components and features of a general WWW server device. Nonvolatile memory 18A of management server device 18 stores several SDFs each corresponding to a trusted Java-APP. Each SDF contains, as explained above, data indicating a scope of rights which are granted to the trusted Java-APP. Each SDF further contains data which indicates whether the SDF is valid or invalid. Before mobile station 16 runs a trusted Java-APP, mobile station 16 needs to access management server device 18 and check if the SDF is valid or invalid. On the basis of a result of the check, mobile station 16 determines to execute or not to run the trusted Java-APP.

FIG. 2 illustrates an example of HTTP message which is transmitted when contents of a SDF are provided by management server device 18 to mobile station 16.

The line starts with 'Content-Type' shown in FIG. 2, which is a field indicating a type of entity body of the HTTP message. In this case, the field contains a parameter of 'application/x-sdf' which indicates that the entity body relates to a SDF.

Parameter 'Sts' is for indicating whether the SDF is valid or invalid, and called 'SDF status' in the following explanation. When SDF status is '00', it means the SDF is valid, and when SDF status is '10', it means the SDF is invalid. For example, in the example shown in FIG. 2, since the parameter 'Sts' is '00', the SDF is valid. The parameter 'Package URL' is the same package URL as contained in an ADF as explained above.

Parameter 'CheckCnt' is for indicating a number of times up to which a mobile station is allowed to run the trusted Java-APP in succession without carrying out a SDF check, and the number of times is called 'count for SDF check' in the following explanation. From a different point of view, a count for SDF check is frequency data showing how frequently a mobile station is required to carry out SDF checks.

In the present embodiment, for example, a count for SDF check is one of integral numbers between 1 and 999. In the example shown in FIG. 2, the parameter 'CheckCnt' is '005', and it means that mobile station 16 is allowed to run the trusted Java-APP in succession up to 5 times without carrying our a SDF check.

Parameter 'CheckInt' is for indicating a time interval between timings when SDF checks should be carried out, and called 'interval for SDF check' in the following explanation. More concretely, an interval for SDF check means number of days during which mobile station 16 is allowed to run the trusted Java-APP without carrying out a SDF check after the last SDF check. In the present embodiment, for example, an interval for SDF check is one of integral numbers between 1 and 999. In the example shown in FIG. 2, the parameter 'CheckInt' is '020', and it means that mobile station 16 is allowed to run the trusted Java-APP without executing a SDF check for 20 days once mobile station 16 carries out a SDF check, but when 20 days pass after the last SDF check, mobile station 16 is required to carry out a SDF check prior to running the trusted Java-APP.

Parameter 'SuspendedCnt' is for indicating a number of times up to which a mobile station is allowed to run the trusted Java-APP in succession in a case that the mobile station is not able to carry out a SDF check, and the number of times is called 'expanded count for SDF check' in the following explanation.

Mobile station 16 accesses management server device 18 wirelessly and carries out SDF checks. Accordingly, it may become impossible for mobile station 16 to carry out a SDF check when, for example, mobile station 16 is outside the service area of mobile packet communication network 15, namely when it is not reachable, or when a communication failure occurs which may happen more frequently in wireless communications than in cable communications. Therefore, if there is no parameter like 'SuspendedCnt', it may not be possible for a user to use a trusted Java-APP when the user wishes to use it because of a temporary communication failure, and so on, which is highly inconvenient to the user. To avoid such inconvenience, in the present embodiment, it is allowed for a mobile station to run a trusted Java-APP for a limited number of times in succession without carrying out a SDF check even when the mobile station is unable to carry out a SDF check since it is unreachable or in a state of communication failure. In the present embodiment, for example, an expanded count for SDF check is one of integral numbers between 1 and 999. In the example shown in FIG. 2, the parameter 'SuspendedCnt' is '005', and it means that mobile station 16 is allowed to run the trusted Java-APP without carrying out a SDF check up to 5 times in succession even if it is unable to carry out a SDF check.

Parameter 'Lmd' is for indicating a time and date when the SDF was updated last in management server device 18, and the time and date is called 'last update time' in the following explanation.

In the example shown in FIG. 2, the parameter 'Lmd' is '20020614120552', and it means that the SDF was last updated 5 minutes and 52 seconds past 12 o'clock on Jun. 14th in year 2002. Last update times are used by management server device 18 for determining whether it is necessary to reflect updated contents of SDFs to data in mobile station 16.

Parameter 'GetPrivateInfo', 'UserMail', 'MessageApp', 'SetPhoneTheme', 'SetLaunchTime' and 'AllowedHost' are for indicating a scope of rights which are granted to the trusted Java-APP run in mobile station 16, and they are called 'permission data' in the following explanation.

For example, parameter 'GetPrivateInfo' is for indicating whether a trusted Java-AP realized by the trusted Java-APP is allowed to use a trusted Application Programming Interface (referred to as 'trusted API' hereinafter), which is called indispensably by the Java-AP when it needs to refer to confidential data stored in mobile station 16 such as telephone directory data and unread emails. When the trusted Java-AP is allowed to read confidential data, the parameter 'GetPrivateInfo' is set as 'Yes'. Similarly, parameters 'UserMail', 'MessageApp', 'SetPhoneTheme' and 'SetLaunchTime' are for indicating whether the trusted Java-AP is allowed to call trusted APIs, each of which corresponds to the respective parameter, and when it is allowed, the parameter is set as 'Yes'. In the example shown in FIG. 2, all the parameters are set as 'Yes', and it means that the trusted Java-AP is allowed to call the corresponding trusted APIs.

Parameter 'AllowedHost' is for indicating URLs of communication devices which a mobile station is allowed to access while the trusted Java-APP is run in the mobile station, and the URLs are called 'access permitted URLs' in the following explanation.

A Java-APP which is downloaded to mobile station 16 is usually run following a security model which is generally called a sandbox model. According to the sandbox model, while mobile station 16 is running a Java-APP, mobile station 16 is allowed to communicate only with a server from which the Java-APP was downloaded. Under such a strict restriction, it is difficult to provide various kinds of application programs to a user of mobile station 16. Therefore, in the present embodiment, when a trusted Java-APP is run, mobile station 16 is permitted to communicate with certain external communication devices which are specified in advance, in addition to the server from which the trusted Java-APP was downloaded. The parameter 'AllowedHost' shows URLs of external communication devices with which a mobile station is permitted to communicate. In the example shown in FIG. 2, the parameter shows that a mobile station is permitted to communicate with external communication devices whose URLs contain 'http://aaa.co.jp' or 'http://bbb.co.jp' using the port of '8080'.

When the parameter of access permitted URLs is set as 'any', it means that a mobile station is permitted to communicate with any external communication device while the trusted Java-APP is run. Since it may become difficult to keep security of data stored in the mobile station if the mobile station is permitted to communicate with any external communication device following the parameter 'any', it is also possible to specify URLs of certain external communication devices with which a mobile station is not permitted to communicate. Parameter 'DisallowedHost' is prepared for the purpose, and URLs of external communication devices with which a mobile station is not permitted to communicate, which are called 'access prohibited URLs' in the following explanation, are set to the parameter.

(1-4) Mobile Station

Mobile station 16 comprises, as illustrated in FIG. 3, Operating System (referred to as 'OS' hereinafter) software, ROM 16A which stores a Java environment program for constructing an environment for making Java-APPs operable and several other native application programs, CPU 16B which runs programs stored in ROM 16A, display unit 16C, nonvolatile memory 16D, RAM 16E, communicating unit 16F, operating unit 16G and timer 16H. These components are connected to one another through a data bus.

Display unit 16C comprises, for example, a liquid crystal display panel and a panel driver circuit, and displays images following data which are provided by CPU 16B. Communicating unit 16F comprises an antenna and a wireless communication unit, wirelessly communicates data packets with mobile packet communication network 15, and relays data packets between CPU 16B and mobile packet communication network 15. Communicating unit 16F comprises a CODEC, a microphone and a speaker for voice communications, and enables mobile station 16 to conduct voice communications through a mobile telephone network (not shown) which has a line switching system. Operating unit 16G comprises hardware such as keypad for operations of a user, and provides CPU 16B with certain signals in accordance with operations done by the user. Timer 16H keeps the present year, month, date and time (referred to just as 'present time' hereinafter). To make timer 16H keep the correct present time, mobile station 16 may regularly receive data indicating the accurate present time using a control channel from a base station (not shown) in mobile packet communication network 15, and adjust the time kept by timer 16H.

Nonvolatile memory 16D is, for example, a Static Random Access Memory (SRAM) or an Electrically Erasable and Programmable Read Only Memory (EEPROM). Nonvolatile memory 16D stores Java-AP software which are downloaded from servers comprised in WWW.

Details of an ADF and a SDF of trusted Java-AP software, which are stored in nonvolatile memory 16D, will be explained below.

FIG. 4 shows an example of data which are generated in accordance with an ADF and the SDF shown in FIG. 2 of trusted Java-AP software, and stored in nonvolatile memory 16D. As shown in FIG. 4, data stored in nonvolatile memory 16D contains a data field of 'number of execution times', a data field of 'number of passed days' and a data field of 'used expanded count for SDF check' which correspond to 'count for SDF check', 'interval for SDF check' and 'expanded count for SDF check' respectively.

A number of execution times indicates a number of times that mobile station 16 ran the trusted Java-APP after the most recent execution of a SDF check. After the number of execution times reaches the count for SDF check, namely 5 in the example case shown in FIG. 4, mobile station 16 determines that it is required to carry out a SDF check before it runs the trusted Java-APP the next time.

A number of passed days indicates a time period, namely number of days, which passed after the most recent execution of a SDF check by mobile station 16. The passed days are calculated on the basis of the time kept by timer 16H continuously. After the number of passed days reaches the interval for SDF check, namely 20 in the example case shown in FIG. 4, mobile station 16 determines that it is required a SDF check to be carried out before it runs the trusted Java-APP the next time. A used expanded count for SDF check means a number of times that mobile station 16 ran the trusted Java-APP without carrying out SDF check when a SDF check is required since mobile station 16 was not able to carry out a SDF check. After the used expanded count for SDF check reaches the expanded count for SDF check, namely 5 in the example case shown in FIG. 4, mobile station 16 does not run the trusted Java-APP unless it carries out a SDF check successfully.

When a power supply (not shown) of mobile station 16 is turned on, CPU 16B reads the OS program stored in ROM 16A and runs the OS program using RAM 16E as a work area. Following instructions of the OS program, CPU 16B establishes an OS environment in mobile station 16 as illustrated in FIG. 5. After the OS environment is established, CPU 16B is enabled to identify instructions given by the user on the basis of signals provided by operating unit 16G, and execute required data processing in accordance with the instructions.

In the following, when a description like 'the OS executes an operation' is used, it means that CPU 16B executes the operation following instructions provided by the OS program. In the same way, when a description like 'the application executes an operation' is used, it means that CPU 16B runs the application program and executes the operation following instructions provided by the application program. Several applications shown in FIG. 5, such as Java-AP, Java Application Manager (referred to as 'JAM' hereinafter) and telephone directory AP are examples of such application.

When the user instructs mobile station 16 to run a communication program, which is one of native application programs, the OS starts the communication program and realizes a communication AP in mobile station 16. Once the communication AP is realized, the user is able to make a voice call to an external communication device. When the user instructs mobile station 16 to run a telephone directory program, which is also one of native application programs, the OS starts the telephone directory program and realizes a telephone directory program in mobile station 16. The user is able to make mobile station 16 display, use and edit the data of telephone directory (referred to as 'telephone directory data' hereinafter) stored in nonvolatile memory 16D by using telephone directory AP. When the user instructs mobile station 16 to run a Web browser program, which is also one of native application programs, the OS starts the Web browser program and realizes a Web browser in mobile station 16.

When the user instructs mobile station 16 to run a JAM program, which is also one of the native application programs, the OS starts the JAM program and realizes a JAM in mobile station 16. JAM shows the user a list of Java-APPs which are installed in mobile station 16, and executes one of the Java-APPs which is selected by the user. More concretely, if the instruction provided by the user is a request for starting one of the Java-APPs, first a Java-AP environment program is executed to establish a Java-AP environment in mobile station 16, then the Java-APP selected by the user is run to realize the Java-AP in the Java-AP environment. A Java-AP environment contains, for example, K Virtual Machine (KVM) which is a lightweight Java virtual machine tuned for a mobile communication device such as mobile station 16, and APIs which provide several functions to Java-APs. APIs which are prepared for Java-APs are categorized into trusted APIs which only trusted Java-APs, namely Java-APs which are realized by trusted Java-APPs, are permitted to use, and untrusted Java-APIs which all Java-APs are permitted to use.

The JAM further provides functions for managing behavior of Java-APs.

For example, when the JAM receives a request for running a Java-APP, the JAM determines whether a SDF check is required with regard to the SDF of the Java-APP, and if the JAM determines that the SDF check is required, it carries out the SDF check. For the purpose, the JAM provides functions for generating and updating data indicating the number of execution times, the number of passed days and the used expanded count for SDF check which are to be stored in nonvolatile memory 16D. Moreover, when a result of the SDF check indicates that the SDF is valid, the JAM permits the Java-APP to be run, and after the Java-AP is realized, the JAM restricts behavior of the Java-AP according to permission data contained in the SDF. On the other hand, when the result of the SDF check indicates that the SDF is invalid, the JAM does not permit the Java-APP to be run. When the JAM determines on the basis of the result of the SDF check that it is necessary to update the SDF, the JAM again accesses management server device 18, obtains the updated SDF, and updates data stored in mobile station 16.

(2) Operation

In the following, operations of the communication system, whose configurations are described above, will be explained.

(2-1) Installation of Java-APP

Figure 6:
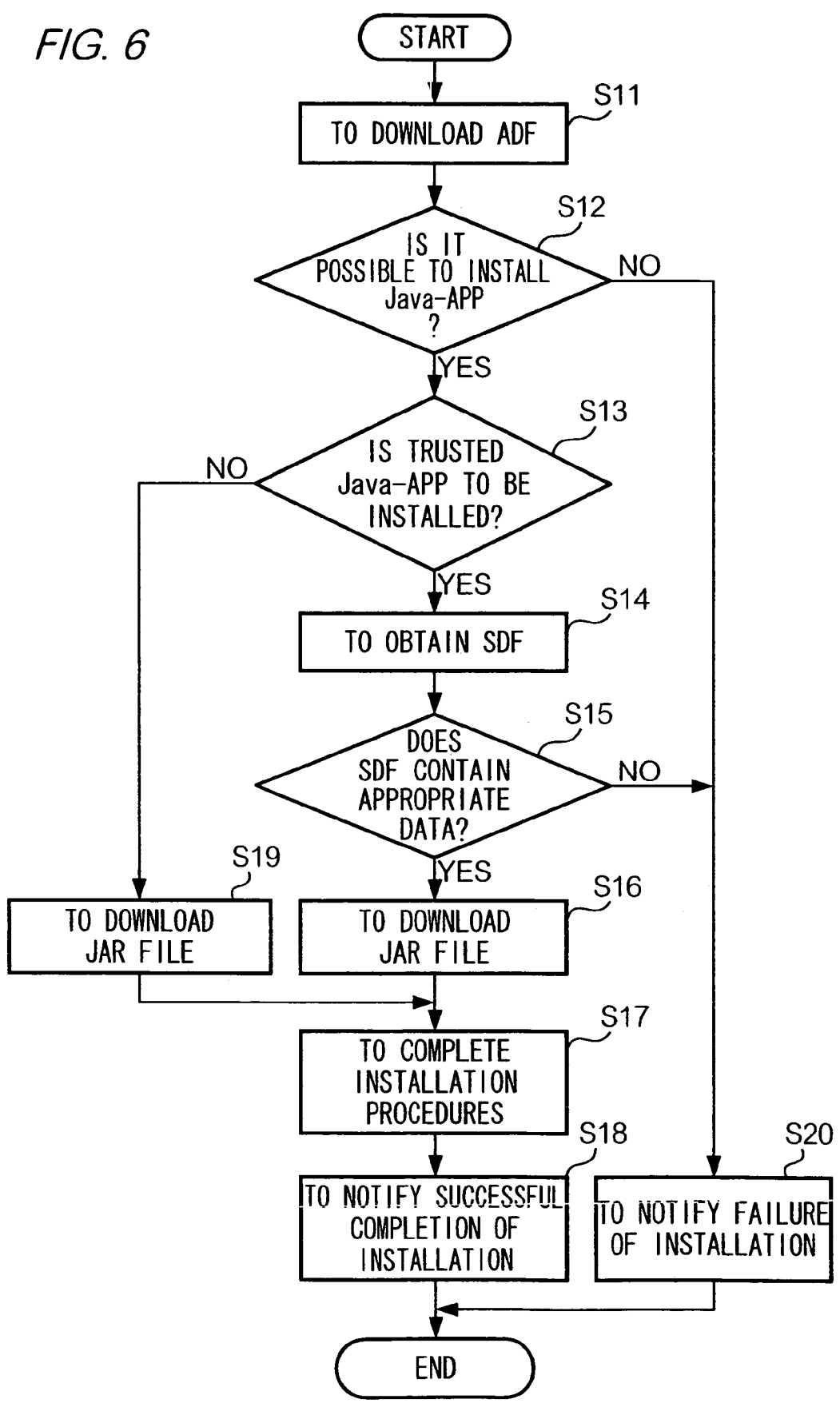
FIG. 6 is a flowchart showing processes of the mobile station for downloading and installing Java-AP software.

When the JAM receives a request for downloading a Java-APP from the Web browser, the JAM starts a series of processes for installing the Java-APP into mobile station 16. FIG. 6 illustrates a flow of the processes.

As illustrated in FIG. 6, the JAM first downloads from CP server device 13 an ADF corresponding to the Java-APP to be downloaded (step S11). More concretely, the JAM generates a HTTP request containing an ADF-URL, transmits the HTTP request to CP server device 13, and receives a HTTP response containing the ADF from CP server device 13 in response to the HTTP request. In this process, an ADF-URL contained in a HTTP request may be input manually by the user, or selected by the user from candidate URLs embedded in a web page described in HyperText Markup Language (referred to as 'HTML' hereinafter). The JAM instructs nonvolatile memory 16D to store data contained in the downloaded ADF such as an APID, a package URL and a SDF-URL an ADF-URL as shown in FIG. 4.

Next, the JAM determines whether it is possible for the Java-APP to be downloaded and installed into mobile station 16 on the basis of the data of the ADF stored in nonvolatile memory 16D (step S12). The JAM may carry out the determination in the same way as in the known system such as by comparing the size of a JAR file indicated in the ADF and available Free space of nonvolatile memory 16D where the JAR file is to be stored.

If the JAM determines that the installation is possible (step S12; Yes), the JAM determines whether the Java-APP to be downloaded is a trusted Java-APP or an untrusted Java-APP (step S13). More concretely, the JAM checks whether an APID and a SDF-URL are contained in the data stored in step S11, and if they are contained, the JAM determines that there is a SDF corresponding to the Java-APP, which means that the Java-APP is a trusted Java-APP. Contrarily, if an APID and a SDF-URL are not contained, the JAM determines that the Java-APP is an untrusted Java-APP. Now it is supposed that an APID and a SDF-URL are contained in the downloaded ADF, and the JAM determines that the Java-APP to be downloaded is a trusted Java-APP (step S13; Yes).

The JAM receives a SDF corresponding to the trusted Java-APP from management server device 18 (step S14). More concretely, the JAM establishes a TCP connection between management server device 18, generates a HTTP request containing the SDF-URL obtained from the ADF, transmits the HTTP request to management server device 18, receives a HTTP response (please refer to FIG. 2) in response to the HTTP request, and disconnects the TCP connection.

The JAM verifies whether the received SDF contains appropriate data (step S15). More concretely, the JAM checks whether the received SDF is described following a certain format, checks whether an APID contained in the SDF and the APID stored in nonvolatile memory 16D matches, and so on, and all results of the checks are affirmative, the JAM determines that the received SDF contains correct appropriate data (step S15; Yes). Then, the JAM instructs nonvolatile memory 16D to store the data contained in the SDF as shown in FIG. 4.

The JAM downloads the JAR file from CP server device 13 (step 516). More concretely, the JAM generates a HTTP request containing the package URL stored in nonvolatile memory 16D, transmits the HTTP request to CP server device 13 and receives a HTTP response containing the JAR file from CP server device 13 in response to the HTTP request.

The JAM instructs the received JAR file to store nonvolatile memory 16D and installs the trusted Java-APP contained in the JAR file following normal procedures for installing a Java-APP (step S17). Then the JAM notifies to the user that the installation is completed successfully (step S18).

After the installation is completed, when the trusted Java-APP is run, the JAM monitors behavior of the trusted Java-AP which is realized by the Java-APP, and restricts the trusted Java-AP to using only certain trusted APIs according to permission data contained in the SDF and stored in nonvolatile memory 16D.

During the above-mentioned processes, when it is determined that the Java-APP is unable to be installed (step S12; No), or when the SDF does not contain appropriate data (step S15; No), the JAM notifies the user that the installation failed (step S20), and restores software configurations in mobile station 16 to a state previous to step S11.

During the above-mentioned processes, when it is determined that the Java-APP to be installed is an untrusted Java-APP (step S13; No), the JAM downloads the JAR file from CP server device 13 according to a package URL contained in the ADF following an ordinary procedure (step S19), and installs an untrusted Java-APP contained in the JAR file following normal procedures for installing a Java-APP (step S17). Then the JAM notifies to the user that the installation is completed successfully (step S18).

(2-2) Starting of Java-APP

Figure 7:
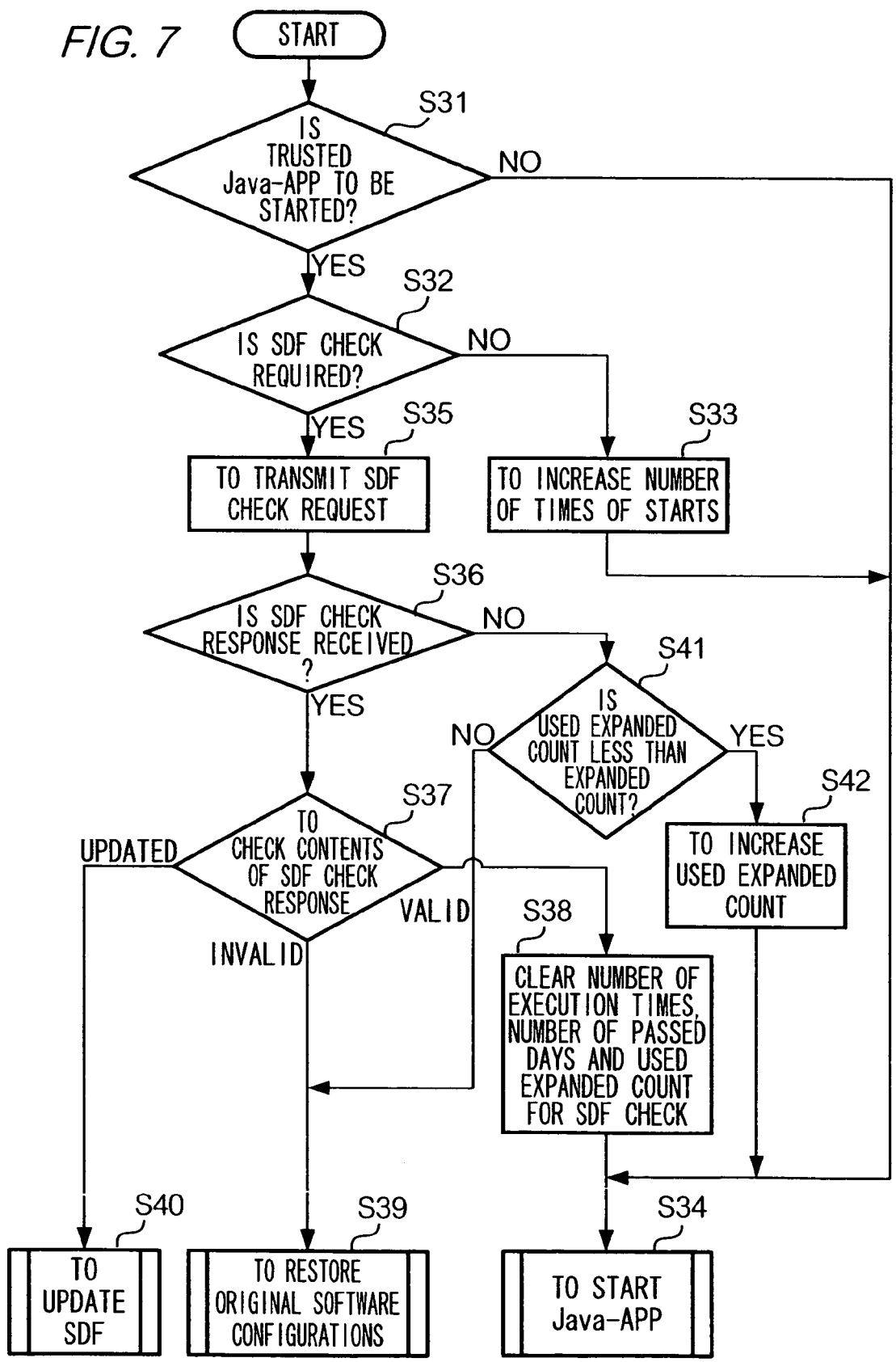
FIG. 7 is a flowchart showing processes of mobile station for starting the Java-AP software.

In the following, operations for starting a Java-APP will be explained with reference to FIG. 7.

When the JAM receives from the user a request for starting a Java-APP, the JAM determines whether the Java-APP to be started is a trusted Java-APP or an untrusted Java-APP (step S31). When it is determined that a trusted Java-APP is to be started (step S31; Yes), the JAM determines whether a SDF check is required (step S32). More concretely, the JAM checks data stored in nonvolatile memory 16D, and determines that a SDF check is required when the number of execution times is more than the count for SDF check, or when the number of passed days is more than the interval for SDF check. On the other hand, the JAM determines that a SDF check is not required when both of the conditions are not met.

For example, according to the data shown in FIG. 4, both of the above-mentioned conditions are not met, the JAM determines that a SDF check is not required (step S32; No). Then, the JAM adds 1 to the number of execution times and updates the number stored in nonvolatile memory 16D (step S33), and starts the trusted Java-APP (step S34).

After the same trusted Java-APP is repeatedly started by the JAM as explained above, the number of execution times may become the same as the count for SDF check. In the case, the JAM determines that a SDF check is required (step S32; Yes), generates a HTTP request for requesting a SDF check operations, and transmits the HTTP request to management server device 18 (step S35). The HTTP request contains an APID and data indicating last update time of the SDF corresponding to the trusted Java-APP to be started, namely the value of parameter 'Lmd'.

After receiving the HTTP request, management server device 18 extracts the APID from the HTTP request, reads a SDF containing the APID stored in nonvolatile memory 18A and checks a validity status of the SDF. Management server device 18 also extracts the last update time from the HTTP request, compares the extracted last update time and a last update time contained in the SDF read from nonvolatile memory 18A, and determines whether it is necessary to update the SDF stored in mobile station 16. More concretely, management server device 18 determines that the update is necessary if the last update time extracted from the HTTP request is older than the last update time in the SDF stored in nonvolatile memory 18A, and determines that the update is not necessary if both of the last update times are the same. According to a result of the above-mentioned determination, management server device 18 generates a HTTP response containing data indicating a validity status of the SDF, and transmits the HTTP response to mobile station 16 as a SDF check response.

FIG. 8 and FIG. 9 show examples of SDF check response.

FIG. 8 shows a SDF check response which is generated when the SDF is valid. In the case as shown in FIG. 8, the value of parameter 'Sts', which indicates the validity status of the SDF, is set as '00' meaning 'valid'. On the other hand, FIG. 9 shows a SDF check response which is generated when the SDF is invalid. In the case, as shown in FIG. 9, the value of parameter 'Sts' is set as '10' meaning 'invalid'. When the SDF is valid but it is updated, the value of parameter 'Sts' is set as '01' indicating that it is necessary for the SDF to be updated (not shown in the drawings). When a SDF containing the APID received from mobile station 16 is not stored in nonvolatile memory 18A, the value of parameter 'Sts' is set as '99' indicating that the SDF could not be found (not shown in the drawings).

When mobile station 16 receives the SDF check response (step S36; Yes), the JAM checks the contents of the SDF check response (step S37).

For example, when the JAM receives a SDF check response as shown in FIG. 8, the JAM determines that the SDF is valid (step S37; valid), clears the number of execution times, the number of passed days and the used expanded count for SDF check stored in nonvolatile memory 16D (step S38), and starts the trusted Java-APP (step S34).

On the other hand, when the JAM receives a SDF check response as shown in FIG. 9, the JAM determines that the SDF is invalid (step S37; invalid), displays a message that the Java-APP is unable to be started, and restores software configurations in mobile station 16 to a state previous to step S31 (step S39).

When the received SDF check response indicates that the SDF is updated, the JAM determines that the SDF stored in nonvolatile memory 16D is required to be updated (step S37; update), and carries out procedures for updating the SDF (step S40). More concretely, similarly to operations in step S14 of FIG. 6, the JAM receives data of the updated SDF from management server device 18, verifies that the received data of the updated SDF are appropriate, and stores the data of the updated SDF in nonvolatile memory 16D.

During the above-mentioned operations, if the JAM is unable to start or fails to complete a SDF check because, for example, mobile station 16 is in an unreachable state or a communication failure happens (step S36; No), the JAM checks the data stored in nonvolatile memory 16D and determines whether the used expanded count for SDF check is less than the expanded count for SDF check (step S41).

When the used expanded count for SDF check is less than the expanded count for SDF check (step S41; Yes), the JAM adds 1 to the used expanded count for SDF check and updates the count stored in nonvolatile memory 16D (step S42). Then, the JAM starts the trusted Java-APP (step S34).

On the other hand, when the used expanded count for SDF check is the same as or more than the expanded count for SDF check (step S41; No), the JAM displays a message that it is unable to carry out a SDF check and the Java-APP is unable to be started, and restores software configurations in mobile station 16 to a state previous to step S31 (step S39).

(2-3) Example of Operations of the Overall Communication System for Making a Trusted Java-APP Operable In the following, an example of a series of operations for making a trusted Java-APP operable, which follows the above-mentioned steps, will be explained with reference to FIG. 10.

In the following explanation, operations which are carried out by the JAM or other applications, such as Java-APs, are described as operations which are carried out by 'mobile station 16'.

Figure 10:
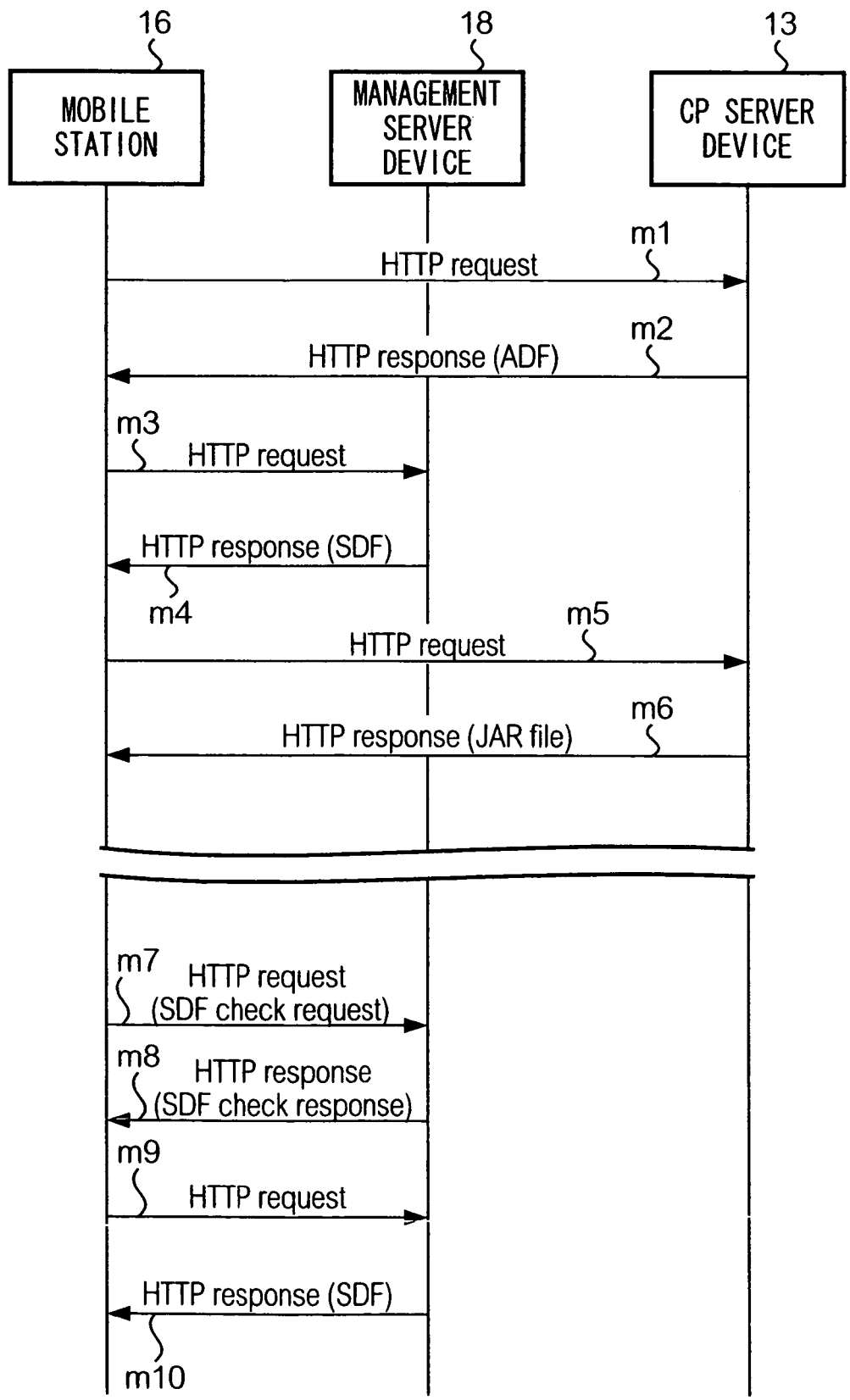
FIG. 10 is a sequence chart showing a series of operations in the communication system.

In FIG. 10, when mobile station 16 receives from the user a request for downloading a Java-APP, mobile station 16 generates HTTP request m1 which contains an ADF-URL of an ADF corresponding to the Java-APP to be downloaded, and transmits HTTP request m1 to CP server device 13.

In response to HTTP request m1, CP server device 13 generates HTTP response m2 which contains the corresponding ADF, and transmits HTTP response m2 to mobile station 16.

After receiving HTTP response m2, mobile station 16 stores data of the ADF in nonvolatile memory 16D. If mobile station 16 determines that it is possible to install the Java-APP into mobile station 16, mobile station 16 generates HTTP request m3 which contains a SDF-URL of a SDF, and transmits HTTP request m3 to management server device 18.

After receiving HTTP request m3, management server device 18 generates HTTP response m4 which contains the SDF, and transmits HTTP response m4 to mobile station 16 in response to HTTP request m3.

After receiving HTTP response m4, mobile station 16 verifies that contents of the SDF are appropriate, and stores the SDF in nonvolatile memory 16D. Then, mobile station 16 generates HTTP request m5 which contains a package URL, and transmits HTTP request m5 to CP server device 13.

In response to HTTP request m5, CP server device 13 generates HTTP response m6 which contains a JAR file, and transmits HTTP response m6 to mobile station 16. The JAR file contains the trusted Java-APP to be downloaded.

After receiving HTTP response m6, mobile station 16 stores the received JAR file in nonvolatile memory 16D, and carries out procedures for installing the trusted Java-APP.

After the installation of the trusted Java-APP is completed, when mobile station 16 receives an instruction for starting the Java-APP, mobile station 16 determines whether a SDF check is required or not, and if it is determined that a SDF check is required, mobile station 16 transmits HTTP request m7 which contains an APID and a last update time of the SDF to management server device 18 as a SDF check request.

After receiving HTTP request m7, management server device 18 generates HTTP response m8 which contains data indicating a validity status of the SDF corresponding to the APID contained in HTTP request m7, and transmits HTTP response m8 to mobile station 16 as a SDF check response.

After receiving HTTP response m8, mobile station 16 checks the contents of the SDF check response. For example, when the SDF check response indicates that it is necessary for the SDF to be updated, mobile station 16 updates the SDF. Namely, mobile station 16 generates HTTP request m9 which contains the SDF-URL, and transmits HTTP request m9 to management server device 18.

After receiving HTTP request m9, management server device 18 generates HTTP response m10 which contains the SDF identified by the SDF-URL contained in HTTP request m9, and transmits HTTP response m10 to mobile station 16.

After receiving HTTP response m10, mobile station 16 starts the Java-APP, and runs the Java-APP according to the contents of the updated SDF.

(2-4) Behavior Management of Mobile Station 16 while Java-APP is Run

In the following, management of behavior of mobile station 16 when the above-mentioned Java-APP is run will be explained.

(2-4-1) Untrusted Java-AP

After an untrusted Java-APP is installed in mobile station 16 according to the above-mentioned procedures for installation, the untrusted Java-APP is started, which results in an untrusted Java-AP being realized in mobile station 16. Then, the following behavior management is conducted by mobile station 16.

When an API which is requested to be used by the untrusted Java-AP is an untrusted API, mobile station 16 permits the untrusted Java-AP to use the untrusted API, since, as explained above, untrusted API is permitted to be used by any sort of Java-AP. In short, the untrusted Java-AP is allowed to call the untrusted API.

When an API which is requested to be used by the untrusted Java-AP is a trusted API, mobile station 16 checks whether a SDF corresponding to the Java-AP is stored in nonvolatile memory 16D. Since no SDF corresponding to the untrusted Java-AP is stored in nonvolatile memory 16D, mobile station 16 prohibits the untrusted Java-AP to use the trusted API. In short, the untrusted Java-AP is not allowed to call the trusted API.

(2-4-2) Trusted Java-AP

After a trusted Java-APP is installed in mobile station 16, the trusted Java-APP is started, and a trusted Java-AP is realized in mobile station 16, the following behavior management is conducted by mobile station 16.

When an API which is requested to be used by the trusted Java-AP is an untrusted API, as a matter of course, mobile station 16 permits the trusted Java-AP to use the untrusted API as explained above. In short, the trusted Java-AP is allowed to call the untrusted API.

When an API which is requested to be used by the trusted Java-AP is a trusted API, since a SDF corresponding to the trusted Java-AP is stored in nonvolatile memory 16D, mobile station 16 may permit the trusted Java-AP to use the trusted API. However, in the case, behavior of the trusted Java-AP is restricted according to permission data contained in the SDF.

For example, if parameter 'GetPrivateInfo' in the permission data is set as 'Yes', the trusted Java-AP is allowed to read the telephone directory data and the data containing unread emails stored in nonvolatile memory 16D. At the same time, the trusted Java-AP is allowed to communicate with only external devices whose URLs are contained in parameter 'AllowedHost' in the permission data.

As explained above, mobile station 16 permits behavior of the trusted Java-AP which meet conditions indicated in the permission data contained in the SDF corresponding to the trusted Java-AP, and prohibits behavior which does not meet the conditions. Accordingly, the user can use not only Java-APs in the known system, namely untrusted Java-APs, but also trusted Java-APs, which are allowed to behave more flexibly than untrusted Java-APs, thus enjoying a far greater degree of convenience.

In the communication system according to this embodiment, mobile station 16 receives an ADF, a SDF and a JAR file separately in this order, which also bring some effects as follows.

As explained above, Java-AP software, each of which comprises an ADF and a JAR file, are usually designed and made by CPs, and each CP offers, in their own site (CP server device 13 in FIG. 1) on the Internet, to provide their Java-AP software to any user. Accordingly, a user usually decides to download or not to download Java-AP software after accessing sites of CPs and reading introductory explanations of their Java-AP software shown on pages of the sites. When the user decides to download certain Java-AP software, the user needs to operate his/her mobile station for instructing it to carry out download procedures. For the purpose, the above-mentioned pages of the sites usually contain URLs of the files to be downloaded along with anchor tags. From a viewpoint of CPs, it is the easiest way to embed URLs of ADFs in their pages since ADFs are managed by CPs and URLs of ADFs are well known by CPs. On the other hand, for embedding URLs of SDFs in pages of CPs, CPs have to obtain the URLs from the carrier and keep updating the URLs. However, if an ADF, a SDF and a JAR file are delivered to a mobile station separately in this order, there is no need for a CP to obtain, embed and update a URL of a SDF, which is quite convenient.

Moreover, the above-mentioned method of delivering three sorts of files in a certain order is suitable when procedures for upgrading Java-AP software in the known communication system are taken into account. In the known communication system currently used, when a user requests upgrading Java-AP software, his/her mobile station first checks data contained in an ADF corresponding to the Java-AP software, and tries to obtain an upgraded version of the JAR file using a package URL contained in the ADF. Namely, a mobile station first checks an ADF, then downloads a target JAR file.

Compared to the procedures for upgrading Java-AP software currently adopted as explained above, the procedures for upgrading Java-AP software adopted in the communication system according to the present embodiment have a similar flow. Namely, in the communication system according to the present embodiment, a mobile station first checks an ADF in the same way as in the known system, and after obtaining a SDF-URL contained in the ADF, the mobile station obtains a JAR file using the SDF-URL in a similar way to that of the known system. Accordingly, it is possible to introduce a communication system according to the present embodiment without making significant changes to the system which is currently used. Compared to the method proposed above, if a SDF, an ADF and a JAR file are delivered to a mobile station in this order when Java-AP software is upgraded, once the mobile station obtains the ADF, the mobile station may obtain an upgraded version of the JAR file the next time by referring to the ADF obtained before, namely without referring to the most recent SDF. Since the SDF may be modified when the upgraded version of the JAR file is downloaded into the mobile station, the upgraded version of the JAR file without referring to the most recent SDF may cause security problems. Therefore, an ADF, a SDF and a JAR file should be delivered to a mobile station in this order.

(3) Modification

The present invention is not limited to the embodiment as explained above, and it may be modified within the technical scope of the present invention. Following are examples of such modifications.

In the above-mentioned communication system, behavior of Java-APs is managed with regard to APIs which are used by Java-APs and external devices with which Java-APs communicate, but any other sort of conditions on resources may be set for managing the behavior. 'Resources' may be software resources such as APIs, communication network resources such as communication device with which the Java-AP communicates with, and hardware resources.

'Hardware' may be hardware which a mobile station comprises such as a memory, a speaker, a microphone, an infrared radiation controller and Light Emitting Diode (LED), and 'hardware' may also be external devices which operates cooperatively with the mobile station such as User Identity Module (UIM) and Subscriber Identity Module (SIM).

As a matter of course, 'communication network resources' should not be limited to resources in the communication network such as communication devices with which the mobile station communicates. As mentioned above, the mobile station communicates with mobile communication network wirelessly. During the wireless communications, the mobile station uses wireless communication resources such as wireless channels assigned by the mobile communication network. The wireless communication resources may also be used as the above-mentioned 'communication network resources'. At the same time, the mobile station may use communication resources such as transmission paths for data packet communications and communication paths of a line switching system for voice communications on communication protocol layers which are located higher than the communication protocol layer on which wireless communication resources are used. The communication resources on the higher communication protocol layers may also be used as the above-mentioned 'communication network resources'.

'Software resources' may be APIs, classes, packages, and so on, as explained above. Software resources may provide various kinds of functions, and data processing functions such as encrypting data and data communicating functions such as transmitting and receiving data with other applications such as a Web browser are typical functions. In the present invention, software resources comprised by the above-mentioned external devices may also be used as parameters of conditions for restricting behavior of Java-APs.

In the above-mentioned embodiment, the JAM prohibits certain types of behavior of trusted Java-APs before they behave according to permission data. However, the JAM may manage the behavior of the Java-APs by compulsorily terminating processes of the trusted Java-APs when the JAM detects that the trusted Java-APs attempt to behave in a manner which does not meet conditions indicated in the permission data.

In the above-mentioned communication system, software is delivered to mobile stations, but software may be delivered to other types of communication devices.

In the above-mentioned communication system, the carrier may function as a CP. Namely, a management server device and a CP server device may be located in the same communication node.

The above-mentioned programs run by a CPU of a mobile station, such as JAM program and an OS program, and their related data, may be provided being stored in recording media from which the CPU is able to read the programs and the data, such as magnetic recording media, optical recording media, and ROM. The programs and the data may also be provided to mobile stations through communication networks such as the Internet.

The invention claimed is:

1. A communication device, comprising:
an executing unit configured to execute software;
a memory configured to store permission data, the permission data indicating permissible behavior for an application, the application being a group of functions provided by execution of the software;
a checking unit configured to check, by accessing an external device before the software is executed, whether the permission data are valid; and
an execution control unit configured to:
permit the executing unit to execute the software when, on the basis of a result of the check carried out by the checking unit, the permission data are determined to be valid, and when, on the basis of the permission data, that the software to be executed is determined to include permissible behavior, and;
not permit the executing unit to execute the software when, on the basis of the result of the check executed by the checking unit, the permission data are determined to be invalid or when, on the basis of the permission data, that the software to be executed is determined not to include permissible behavior.

2. A communication device according to claim 1, further comprising,
a determining unit configured to determine whether it is necessary to carry out the check by the checking unit, the checking unit either carrying out or not carrying out the check on the basis of a determination made by the determining unit.

3. A communication device according to claim 2, wherein, the determining unit comprises:
a counting unit configured to count a number of executions of the software; and
a frequency data memory configured to store frequency data indicating how frequently it is necessary to carry out the check; and wherein,
the determining unit is configured to determine, on the basis of a number of executions of the software, as counted by the counting unit, and on the basis of the frequency data stored in the frequency data memory, whether it is necessary to carry out a check by the checking unit.

4. A communication device according to claim 2, wherein, the determining unit comprises:
a timer configured to provide time data indicating a present time; and a time interval data memory for storing time interval data indicating a time interval at which it is necessary to carry out the check; and wherein,
the determining unit is configured to calculate, on the basis of time data provided by the timer, a time period between a present time and a time recorded at a most recent execution of the software, and determines whether it is necessary to carry out the check by the checking unit on the basis of the calculated time period and the time interval data stored in said time interval data memory.

5. A communication device according to claim 1, further comprising:
a count data memory configured to store count data indicating a number of times that the software is allowed to be executed in a condition that the checking unit is unable to make the check; and
the execution control unit is configured to permit the executing unit to execute the software in a condition that the checking unit is unable to make the check up to a number of times which is indicated by the count data stored in the count data memory.

6. A communication device according to claim 1, further comprising:
an updating unit configured to obtain update data from the external device, and updating the permission data stored in the memory on the basis of the update data.

7. A communication device according to claim 6, wherein:
the updating unit is configured to:
transmit, to the external device, update timing data indicating a timing of a most recent update of the permission data stored in the memory, when the checking unit makes the check;
receive update data transmitted from the external device in response to the transmission of the update timing data; and
update the permission data stored in the memory on the basis of the update data.

8. A communication device according to claim 1, further comprising:
a terminating unit configured to instruct the executing unit to terminate execution of the software when the application attempts to conduct behavior which the application is not permitted to conduct.

9. A communication device according to claim 1, wherein:
the permission data contain information on usage of at least one of an internal hardware resource of the communication device, an external hardware resource of the communication device, a software resource and a communication network resource.

10. A communication device according to claim 1, wherein the application comprises a Java application; and
wherein the permission data comprises a scope of rights which are granted to the Java application.

11. A communication device according to claim 1, wherein the permission data indicates that the application is allowed to access information designated as confidential.

12. A communication device according to claim 1, wherein the permission data indicates that the application is allowed to access telephone directory information.

13. A communication device according to claim 1, wherein permission data indicates that the application is allowed to access e-mail information.

14. A communication device according to claim 1, wherein permission data indicates that the application is allowed to reconfigure the communication device.

15. A communication device according to claim 1, wherein permission data indicates that the application is allowed to access configuration information relating to the communication device.

16. A method for controlling a communication device, the method comprising:
   transmitting to the communication device permission data, the permission data indicating permissible behavior for an application, the application being a group of functions provided by execution of software in the communication device;
   checking, by communicating data between the communication device and an external device, whether the permission data are valid, before the software is executed in the communication device;
   permitting the software to be executed only when the permission data are determined to be valid on the basis of a result of the check and when the software to be executed is determined to include permissible behavior on the basis of the permission data, and
   disallowing the executing unit to execute the software when, on the basis of the result of the check executed by the checking unit, the permission data are determined to be invalid or when, on the basis of the permission data, that the software to be executed is determined not to include permissible behavior.

17. The method according to claim 16, wherein the permission data indicates that the application is allowed to access information designated as confidential.

18. A computer readable storage medium storing a program for causing a computer to execute a process, the process comprising:
   storing, in a memory, permission data indicating permissible behavior for an application, the application being a group of functions provided by execution of software;
   checking, by accessing an external device, whether the permission data are valid, before the software is executed;
   permitting the software to be executed only when the permission data are determined to be valid on the basis of a result of the check and when the software to be executed is determined to include permissible behavior on the basis of the permission data; and
   disallowing the software to be executed when, on the basis of the result of the check, the permission data are determined to be invalid or when, on the basis of the permission data, that the software to be executed is determined not to include permissible behavior.

19. The computer readable storage medium according to claim 18, wherein the permission data indicates that the application is allowed to access information designated as confidential.

20. A communication method in a communication system comprising (a) a software data providing server device which stores software data containing software for providing a group of functions forming an application, (b) a management server device which stores security descriptor data containing permission data indicating permissible behavior for the application, and (c) an application descriptor data providing server device which stores application descriptor data indicating a storage location of the software data and a storage location of the security descriptor data, the method comprising:
   transmitting the application descriptor data from said communication system to said communication device;
   transmitting data indicating the storage location of the security descriptor data contained in the application descriptor data from said communication device to said communication system;
   transmitting the security descriptor data from said communication system to said communication device on the basis of the data indicating the storage location of the security descriptor data;
   storing the security descriptor data in said communication device;
   transmitting data indicating the storage location of the software data contained in the security descriptor data from said communication device to said communication system;
   transmitting the software data from said communication system to said communication device on the basis of the data indicating the storage location of the software data;
   installing, in said communication device, the software contained in the software data transmitted from said communication system to said communication device;
   checking, by communicating data between said communication device and said communication system before the software is executed in said communication device, whether the security descriptor data stored in said communication device are valid;
   permitting said software to be executed in said communication device only when the security descriptor data are determined to be valid on the basis of a result of the check and when the software to be executed is determined to include permissible behavior on the basis of the permission data; and
   disallowing the software to be executed in said communication device when the security descriptor data are determined to be invalid on the basis of the result of the check or when, on the basis of the permission data, that the software to be executed is determined not to include permissible behavior.

21. The method according to claim 20, wherein the permission data indicates that the application is allowed to access information designated as confidential.

* * * * *

UNITED STATES PATENT AND TRADEMARK OFFICE
CERTIFICATE OF CORRECTION

| | | |
|---|---|---|
| PATENT NO. | : 7,421,577 B2 | Page 1 of 1 |
| APPLICATION NO. | : 10/815106 | |
| DATED | : September 2, 2008 | |
| INVENTOR(S) | : Yuichi Ichikawa et al. | |

It is certified that error appears in the above-identified patent and that said Letters Patent is hereby corrected as shown below:

On the Title Page

Item (75), after "Ichikawa," delete "Yokosuka" and substitute --Yokosuka-shi-- in its place; after "Naruse," delete "Yokohama" and substitute --Yokohama-shi-- in its place; after "Tatsuro Oi," delete "Kawasaki" and substitute --Kawasaki-shi-- in its place; after "Watanabe," delete "Sayama" and substitute --Sayama-shi-- in its place; after "Hattori," delete "Fujisawa" and substitute --Fujisawa-shi-- in its place; after "Takeshita," delete "Mitaka" and substitute --Tokyo-- in its place; after "Asai," delete "Yokosuka" and substitute --Yokosuka-shi-- in its place; after "Tsuda," delete "Shinagawa" and substitute --Tokyo-- in its place; after "Tomioka" delete "Yokohama" and substitute --Yokohama-shi-- in its place; after "Yamada," delete "Yokohama" and substitute --Yokohama-shi-- in its place; after "Murakami" delete "Ichikawa" and substitute --Ichikawa-shi-- in its place.

Signed and Sealed this

Fourteenth Day of July, 2009

JOHN DOLL
*Acting Director of the United States Patent and Trademark Office*